United States Patent
Enyeart et al.

(10) Patent No.: US 11,548,375 B2
(45) Date of Patent: Jan. 10, 2023

(54) MULTI-BOSS FLANGE

(71) Applicants: Daniel Ray Enyeart, Gladstone, OR (US); Evan Waymire, Oregon City, OR (US)

(72) Inventors: Daniel Ray Enyeart, Gladstone, OR (US); Evan Waymire, Oregon City, OR (US)

( * ) Notice: Subject to any disclaimer, the term of this patent is extended or adjusted under 35 U.S.C. 154(b) by 513 days.

(21) Appl. No.: 16/417,143

(22) Filed: May 20, 2019

(65) Prior Publication Data

US 2019/0270378 A1    Sep. 5, 2019

Related U.S. Application Data

(63) Continuation-in-part of application No. 29/626,889, filed on Nov. 21, 2017, now Pat. No. Des. 886,958.

(51) Int. Cl.
*B60K 15/067*    (2006.01)
*B60K 15/035*    (2006.01)
*F02M 37/00*    (2006.01)
*B60K 15/03*    (2006.01)

(52) U.S. Cl.
CPC .......... *B60K 15/035* (2013.01); *B60K 15/067* (2013.01); *F02M 37/0011* (2013.01); *B60K 2015/0348* (2013.01); *B60K 2015/03217* (2013.01); *B60K 2015/03523* (2013.01)

(58) Field of Classification Search
CPC ........ B60K 15/067; B60K 2015/03523; B60K 2015/03217; B60K 2015/0348; B60K 2015/03528
See application file for complete search history.

(56) References Cited

U.S. PATENT DOCUMENTS

| | | | |
|---|---|---|---|
| D632,630 S * | 2/2011 | Watson | D12/218 |
| D698,302 S * | 1/2014 | Waymire | D12/218 |
| 2008/0185491 A1* | 8/2008 | Bosch | F02M 37/103 |
| | | | 248/346.5 |

* cited by examiner

*Primary Examiner* — Stephen J Castellano
(74) *Attorney, Agent, or Firm* — Ingrid McTaggart

(57) ABSTRACT

The present invention relates to a flange that includes a base region, a raised region, and a sloped region there between. The sloped region includes concave and convex curved regions positioned in a plane parallel to an elongate axis of the flange, and concave and convex curved regions positioned in a plane perpendicular to the elongate axis of the flange so as to reduce stress within and fatigue failures of the flange.

15 Claims, 2 Drawing Sheets

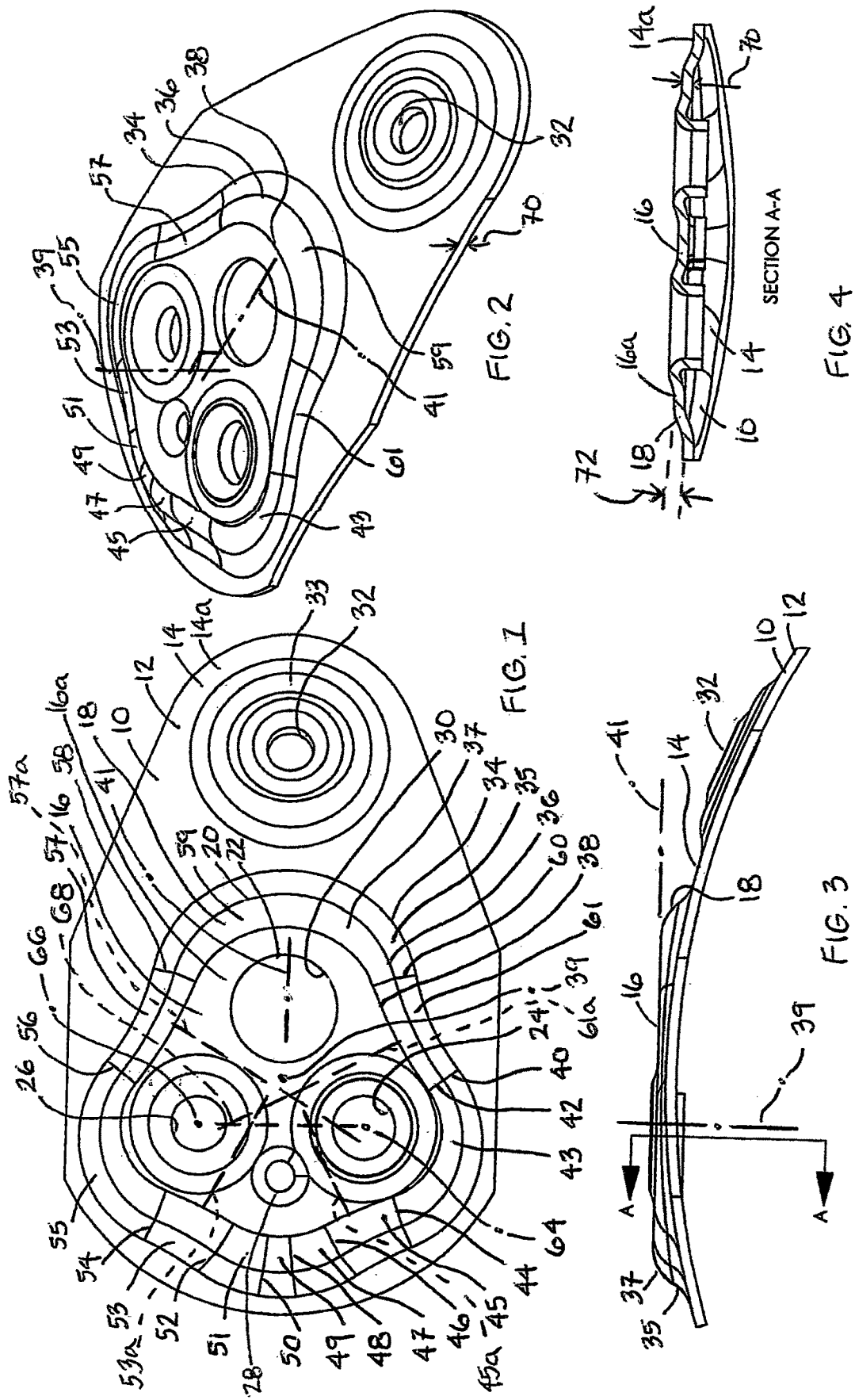

MULTI-BOSS FLANGE

This application is a continuation in part of U.S. patent application Ser. No. 29/626,889, filed on Nov. 21, 2017, now U.S. Design Pat. No. D886,958, in the name of inventor Evan Waymire, and entitled Draw and Return Tube Assembly.

1. TECHNICAL FIELD

The present invention relates to an anti-fatigue flange for a fuel tank assembly, and a process of manufacturing the same, for use in commercial vehicles, and more particularly, to an anti-fatigue flange for a fuel tank assembly that allows multiple components to be connected to a flange wherein the flange includes contours that reduce stress points within the flange so as to reduce fatigue failures of the flange.

2. BACKGROUND OF THE INVENTION

The present invention is particularly intended for use on commercial vehicles, which may include multiple components secured to or in a fuel tank. Prior art fuel tanks may include multiple components secured to a flat flange wherein the flat flange includes an area within the plane of the flange that is susceptible to a diaphragm effect and fatigue failure of the flange. Accordingly, there is a need to reduce fatigue failure of prior art flanges which include multiple components secured thereto.

SUMMARY OF THE INVENTION

The present invention provides a multi-boss flange, and a process of manufacturing the same, that overcomes the disadvantages of the prior art. In particular, the present invention provides a multi-boss flange that includes raised regions and contours which are strategically shaped and arranged to reduce stress within the flange and thereby reduce fatigue failures of the flange of the present invention. One embodiment of the present invention provides a flange that includes: contours around a raised region wherein the contours angle across the direction of highest stress within the flange; contours around a raised region that are positioned so as to shorten blank sections between components secured on the flange; and raised edges positioned around component connection regions. The contours may include alternating concave and convex sections to reduce stress within the flange.

BRIEF DESCRIPTION OF THE DRAWINGS

FIG. 1 is a top view of one example embodiment of a multi-boss flange.

FIG. 2 is an isometric view of the multi-boss flange of FIG. 1.

FIG. 3 is a side view of the multi-boss flange of FIG. 1 including a section line A-A extending there through.

FIG. 4 is a cross sectional view taken along line A-A of the multi-boss flange of FIG. 3.

DETAILED DESCRIPTION OF THE PREFERRED EMBODIMENTS

Figure 5:
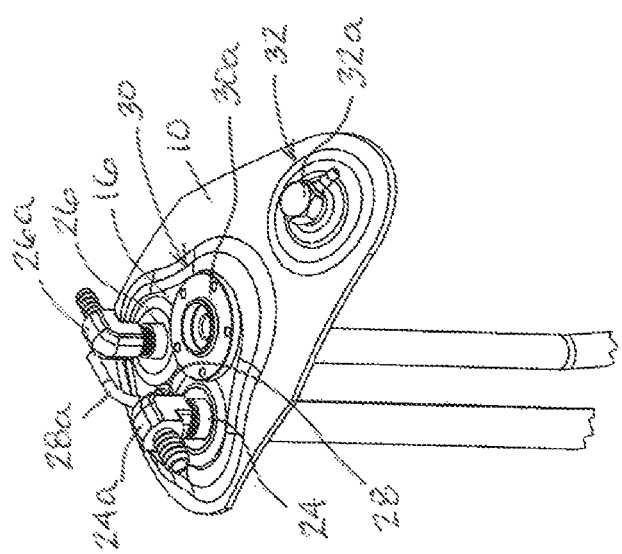
FIG. 5 is an isometric view of one example embodiment of a flange including components secured within apertures of the flange.

The invention discloses a multi-boss flange that allows multiple components to be secured to the flange, while reducing stress points and fatigue failures of the flange. In particular, the present invention provides a multi-boss flange that includes raised regions and contours which are strategically shaped and arranged to reduce stress within the flange and thereby reduce fatigue failures of the flange during the harsh environmental conditions of highway driving. One embodiment of the present invention provides a flange that includes: contours around a raised region wherein the contours angle across the direction of highest stress within the flange; contours around a raised region that are positioned so as to shorten blank sections between components secured on the flange; and raised edges positioned around component connection regions. The contours may include alternating concave and convex sections to reduce stress within the flange. The invention will now be described with reference to the drawings.

FIG. 1 is a top view of one example embodiment of a multi-boss flange 10. Flange 10 includes a body 12 having a base region 14, a raised region 16, and a sloped region 18 extending between base region 14 and raised region 16. Sloped region 18 includes contour lines 20 that conform in shape to component apertures 22 positioned on raised region 16. In other words, contour lines 20 curve around several of the component apertures 22 so that in several places, contour lines 20 closely follow the curved shape of perimeter of component apertures 22. The component apertures 22 on raised region 16 may include a fuel draw aperture 24 sized to receive a fuel draw tube 24a therein, a fuel return aperture 26 sized to receive a fuel return tube 26a therein, an auxiliary fuel aperture 28 sized to receive an auxiliary fuel tube 28a therein, and a level sender receiving aperture 30 sized to receive a level sender unit 30a therein. Body 12 of flange 10 may further include another component aperture 22, namely, a vent receiving aperture 32 sized to receive a vent assembly 32a therein. Vent receiving aperture 32 may include a raised region 33 surrounding aperture 32, wherein raised region 33 is not a part of or connected to raised region 16.

Still referring to FIG. 1, sloped region 18 includes contour lines 20 that conform in shape to the component apertures 22 positioned on raised region 16. In particular, contour lines 20 may include first contour line 34, second contour line 36 and third contour line 38. First contour line 34 may be positioned on base region 14 and may define the beginning of sloped region 18 that extends upwardly from base region 14 to raised region 16. Second contour line 36 may be defined as approximately half way up, or the mid-point, of the sloped region 18 that extends upwardly from base region 14 to raised region 16. Third contour line 38 may be positioned on raised region 16 and may define the end of sloped region 18 that extends upwardly from base region 14 to raised region 16. The region 35 of sloped region 18 that is positioned between first contour line 34 and second contour line 36 may define a concave region 35 that is curved downwardly toward base region 14, i.e., the shape of the interior of a bowl when viewed from the top of body 12. Region 37 of sloped region 18 that is positioned between second contour line 36 and third contour line 38 may define a convex region 37 that is curved upwardly toward raised region 16, i.e., the shape of the exterior of a bowl when viewed from the top of body 12. Accordingly, second contour line 36 defines an inflection line or transition line between the region 35 of concave curvature of slope 20 downhill of second contour line 36 and the region 37 of convex curvature of slope 20 uphill of second contour line 36 (FIG. 3).

Body 12 may further define a vertical axis 39 (FIG. 3) and a horizontal, or elongate, axis 41 (FIG. 1). Raised region 16 defines a plane 16a that is positioned upwardly along axis 39 from a plane 14a of base region 14 such that plane 16 is parallel to elongate axis 41 and perpendicular to axis 39. In the embodiment shown, plane 16a is positioned a height 72 approximately 0.5 inches above plane 14a of base region 14a as measured along axis 39. The concave shape or contour of first slope region 35 and the convex shape or contour of second slope region 37 may be defined as the curvature or contour of the slope of sloped region 18 measured in a plane perpendicular to raised region 16 and parallel to and including vertical axis 39, so that flange 10 may be described as including alternating concave and convex contoured regions positioned in a plane perpendicular to body 12 of flange 10.

Positioned along contour lines 20 are section lines 40 that are positioned generally perpendicular to contour lines 20 and that mark a change in contour or curvature, i.e., an inflection line or transition line, of contour lines 20 with respect to component apertures 22 positioned on raised region 16. In particular, section lines 40 mark the transition of contour lines 20, i.e., the set of contour lines 34, 36 and 38, from a concave curvature to a convex curvature, and vice verse, with respect to component apertures 22 positioned on raised region 16. Section lines 40 may include individual section lines, also referred to as lines of inflection, 42, 44, 46, 48, 50, 52, 54, 56, 58 and 60. Section lines 42 and 44 define a concave section 43 there between, such that contour lines 34, 36 and 38 between section lines 42 and 44 are positioned concave toward fuel draw aperture 24, meaning that contour lines 34, 36 and 38 each define a curve that generally follows a curvature of the perimeter of fuel draw aperture 24. In other words, contour lines 34, 36 and 38 each define a curve similar to the interior shape of a bowl in section 43 with respect to fuel draw aperture 24. Section lines 44 and 46 define a convex section 45 there between, such that contour lines 34, 36 and 38 between section lines 44 and 46 are positioned convex away from fuel draw aperture 24. In other words, contour lines 34, 36 and 38 each define a curve similar to the exterior shape of a bowl in section 45 with respect to fuel draw aperture 24. Section lines 46 and 48 define a concave section 47 there between, such that contour lines 34, 36 and 38 between section lines 46 and 48 are concave inwardly toward fuel auxiliary aperture 28. Similarly, sections 51, 55, and 59 are each concave sections that are concave inwardly toward the closest component aperture 22 to the corresponding section. Sections 53, 57, and 61 are each convex sections that are convex outwardly away from the closest component aperture 22 to the corresponding section.

The concave or convex shape or contour of sections between sections lines, such as section 43 between sections lines 42 and 44, and section 45 between section lines 44 and 46, may be defined as the curvature or contour of the slope of sloped region 18 measured in a plane parallel to raised region 16 and including horizontal axis 41, so that flange 10 may be described as including alternating concave and convex contoured regions positioned in a plane parallel to body 12 of flange 10, and perpendicular to axis 39.

Accordingly, this alternating pattern of convex and concave sections between adjacent section lines 40 continues around raised region 16 with each section between adjacent section lines alternating between being positioned concave toward raised region 16 and being positioned convex toward raised region 16. Simultaneously, sloped region 18 includes a convex region 37 uphill of contour line 36 and a concave region 35 downhill of contour line 36, as sloped region 18 extends around raised region 16. This arrangement of concave and convex contours parallel to the plane of raised region 16, and concave and convex contours perpendicular to the plane of raised region 16, provides for reduced stress and reduced fatigue failures of flange 10 when in use. The description of the stress reduction provided by these alternating concave and convex sections in planes parallel to and perpendicular to body 12 of flange 10 will now be described.

Still referring to FIG. 1, fuel draw aperture 24 defines a fuel draw axis 64 and fuel return aperture 26 defines a fuel return axis 66. A fuel draw tube may be secured with the fuel draw aperture and a fuel return tube may be secured with the fuel return apertures, wherein the tubes may be elongate tubes that extend downwardly into a fuel tank on which the flange is mounted. During typical highway driving conditions, movement of the vehicle may cause the fuel within the tank to oscillate and vibrate which may cause a resonancy effect that causes stress and fatigue of the fuel tank and the flange mounted thereon. A stress line 68 may be defined as extending from axis 64 to axis 66 as a result of stresses imparted to the draw and return tubes from the fuel within the fuel tank. In Prior art flat flanges that do not include a sloped region 18 between component apertures 22 and base region 14, this stress line 68 may define the region of highest stress within the prior art flanges. Accordingly, during periods of high stress and fatigue, prior art flanges may undergo a diaphragm effect, or a folding effect, at stress line 68 such that the prior art flanges may fold along the line connecting the fuel draw aperture and the fuel return aperture.

Applicants have provided the present design so as to reduce the diaphragm effect at stress line 68 so that the flange 10 of the present invention has a reduced tendency to fold along stress line 68. First, Applicants design provides a plurality of component apertures 22 on a raised region 16 so that sloped region 18 provides a bi-level flange that reduces the tendency of flange 10 to fold at line 68. Second, Applicants design provides sloped region 18 with a lower concave region 35 and an upper convex region 37 that further reduces the tendency of flange 10 to fold at line 68. In other words, Applicants design provides alternating concave and convex regions in a plane perpendicular to base region 14 to reduce the tendency of flange 10 to fold at line 68. Third, Applicants design provides alternating concave and convex regions in a plane parallel to base region 14, such as sections 43, 45, 47, 49, 51, 53, 55, 57, 59 and 61, to reduce the tendency of flange 10 to fold at line 68. In particular, convex sections 45, 53, 57, and 61 each define a normal line 45a, 53a, 57a and 61a, that each intersect line 68 that each normal line extends between adjacent component aperture 22, such that stress induced along line 68 will be transferred in part to each of normal lines 45a, 53a, 57a and 61a, thereby diffusing and reducing the stress experienced by flange 10 at line 68. In particular, normal line 45a extends between fuel draw aperture 24 and fuel auxiliary aperture 28 and intersects stress line 68. Normal line 53a extends between fuel return aperture 26 and fuel auxiliary aperture 28 and intersects stress line 68. Normal line 57a extends between fuel return aperture 26 and level sender aperture 30 and intersects stress line 68. Normal line 61a extends between fuel draw aperture 24 and level sender aperture 30 and intersects stress line 68. Applicants believe that these normal lines that intersect stress line 68 reduce the stress and resultant fatigue failures of the flange 10 of the present invention by approximately five percent, compared with prior art flanges that do not include such stress reducing normal lines therein.

FIG. 2 is an isometric view of the multi-boss flange 10 of FIG. 1.

FIG. 3 is a side view of the multi-boss flange 10 of FIG. 1 including a section line A-A extending there through. Flange 10 is shown including sloped region 18 having concave sloped region 35 and convex sloped region 37 positioned in a plane parallel to and including vertical axis 39.

FIG. 4 is a cross sectional view taken along line A-A of the multi-boss flange 10 of FIG. 3 showing that the thickness 70 of flange 10, including the thickness 70 in base region 14, in sloped region 18, and in raised region 16 stays approximately uniform throughout flange 10.

FIG. 5 is an isometric view of one example embodiment of a flange 10 including components secured within apertures of the flange. The component apertures 22 on raised region 16 may include a fuel draw aperture 24 sized to receive a fuel draw tube 24a therein, a fuel return aperture 26 sized to receive a fuel return tube 26a therein, an auxiliary fuel aperture 28 sized to receive an auxiliary fuel tube 28a therein, and a level sender receiving aperture 30 sized to receive a level sender unit 30a therein. Body 12 of flange 10 may further include another component aperture 22, namely, a vent receiving aperture 32 sized to receive a vent assembly 32a therein.

The present invention provides a flange having a base region, a raised region and a sloped region positioned there between. The sloped region defines convex and concave contours, such as the curvatures of contour lines 34, 36 and 38 that are positioned in a plane that is parallel to the top plane of raised region 16 and horizontal axis 41, and perpendicular to a plane that includes vertical axis 39. The sloped region also defines convex and concave contours, such as the curvatures of regions of slope 35 and 37 that are positioned in a plane that is perpendicular to the top plane of raised region 16 and horizontal axis 41, and parallel to a plane that includes vertical axis 39.

As may be understood from the above description and drawings, the present invention has many advantages over prior art fuel tank flanges. In the above description numerous details have been set forth in order to provide a more thorough understanding of the present invention. It will be obvious, however, to one skilled in the art that the present invention may be practiced using other equivalent designs.

We claim:

1. A fuel tank flange, comprising:
   a flange body including a base region, a raised region, and a sloped region extending there between, wherein said raised region is positioned vertically upwardly from said base region as measured along a vertical axis of said flange body;
   a first component aperture and a second component aperture each positioned on said raised region, and
   a first continuous contour line that defines a boundary between said base region and said sloped region, a third continuous contour line that defines a boundary between said raised region and said sloped region, and a second continuous contour line positioned within said sloped region and between said first continuous contour line and said third continuous contour line;
   wherein said third continuous contour line defines a plurality of convex curved regions positioned in a horizontal plane that is positioned perpendicular to said vertical axis of said flange body; and
   wherein said flange defines a line of stress extending between said first component aperture and said second component aperture in said horizontal plane, and wherein said plurality of convex curved regions each define a normal line positioned in said horizontal plane and wherein each normal line intersects said line of stress.

2. The flange of claim 1 wherein said third continuous contour line further defines a plurality of concave curved regions positioned in said horizontal plane, wherein individual ones of said plurality of convex curved regions are each positioned between individual ones of said plurality of concave curved regions such that said third continuous contour line defines an alternating pattern of concave and convex curved regions positioned in said horizontal plane.

3. The flange of claim 1 wherein said first and second continuous contour lines define a convex contoured section there between and positioned in a plane parallel to and including said vertical axis, said second and third continuous contour lines define a concave contoured section there between and positioned in said plane parallel to and including said vertical axis, such that said second continuous contour line is a line of inflection between said concave contoured section and said convex contoured section.

4. The flange of claim 3 wherein said concave contoured section defines a concave contour and said convex contoured section defines a convex contour, said concave contour and said convex contour both positioned in said plane parallel to and including said vertical axis of said flange body.

5. The flange of claim 1 further comprising a third component aperture and a fourth component aperture and wherein a first of said plurality of convex curved regions defines a first normal line positioned in said horizontal plane and that intersects said line of stress and extends between said first and fourth component apertures, a second of said plurality of convex curved regions defines a second normal line positioned in said horizontal plane and that intersects said line of stress and extends between said fourth and second component apertures, a third of said plurality of convex curved regions defines a third normal line positioned in said horizontal plane and that intersects said line of stress and extends between said second and third component apertures, and a fourth of said plurality of convex curved regions defines a fourth normal line positioned in said horizontal plane and that intersects said line of stress and extends between said third and first component apertures.

6. The flange of claim 5 further comprising a fifth component aperture positioned outwardly of said raised region, said fifth component aperture positioned within a second raised region positioned on said base region, said second raised region positioned vertically upwardly from said base region as measured along said vertical axis of said flange body.

7. The flange of claim 6 further including a fuel draw tube secured within said first component aperture, a fuel return tube secured within said second component aperture, a fuel auxiliary tube secured within said third component aperture, a level sender assembly secured within said fourth component aperture, and a vent assembly secured within said fifth component aperture.

8. The flange of claim 1 wherein said sloped region includes a concave sloped region positioned between said second and third continuous contour lines and extending around said raised region, and a convex sloped region positioned between said first and second continuous contour lines and extending around said raised region, said concave sloped region and said convex sloped region both positioned in a plane parallel to said vertical axis of said flange body, and said sloped region further including a plurality of section lines positioned normal to said third continuous contour line, said section lines defining alternating concave curved regions and convex curved regions within said sloped region, said alternating concave and convex curved regions positioned in a plane perpendicular to said vertical axis of said flange body.

9. A fuel tank flange assembly, comprising:

a flange body including a base region, a raised region, and a sloped region extending there between, wherein said raised region is positioned vertically upwardly from said base region as measured along a vertical axis of said flange body, and wherein said sloped region includes a plurality of section lines;

a first component aperture and a second component aperture each positioned on said raised region;

wherein said sloped region defines a plurality of convex curved regions positioned in a plane perpendicular to said vertical axis of said flange and a plurality of concave curved regions positioned in said plane perpendicular to said vertical axis, wherein individual ones of said plurality of convex curved regions are each positioned between individual ones of said plurality of concave curved regions such that said sloped region defines an alternating pattern of concave and convex curved regions positioned in said plane perpendicular to said vertical axis, and wherein individual ones of said plurality of section lines define a boundary between individual ones of said alternating concave and convex curved regions, and wherein said flange defines a line of stress extending between said first component aperture and said second component aperture, and wherein said plurality of convex curved regions each define a normal line positioned in said plane perpendicular to said vertical axis and that intersects said line of stress.

10. The flange assembly of claim 9 wherein said sloped region defines a first continuous contour line, a second continuous contour line, and a third continuous contour line, said first and second continuous contour lines defining a convex contoured section there between, said second and third contour lines defining a concave contoured section there between such that said second continuous contour line is a line of inflection between said concave contoured section and said convex contoured section.

11. The flange assembly of claim 10 wherein said concave contoured section defines a concave contour and said convex contoured section defines a convex contour, said concave contour and said convex contour both positioned in a plane parallel to and including said vertical axis of said flange.

12. The flange assembly of claim 9 further comprising a third component aperture and a fourth component aperture and wherein a first of said plurality of convex curved regions defines a first normal line positioned in said plane perpendicular to said vertical axis and that intersects said line of stress and extends between said first and fourth component apertures, a second of said plurality of convex curved regions defines a second normal line positioned in said plane perpendicular to said vertical axis and that intersects said line of stress and extends between said fourth and second component apertures, a third of said plurality of convex curved regions defines a third normal line positioned in said plane perpendicular to said vertical axis and that intersects said line of stress and extends between said second and third component apertures, and a fourth of said plurality of convex curved regions defines a fourth normal line positioned in said plane perpendicular to said vertical axis and that intersects said line of stress and extends between said third and first component apertures.

13. The flange assembly of claim 12 further comprising a fifth component aperture positioned outwardly of said raised region, said fifth component aperture positioned within a second raised region positioned on said base region, said second raised region positioned vertically upwardly from said base region as measured along said vertical axis of said flange body.

14. The flange assembly of claim 13 further including a fuel draw tube secured within said first component aperture, a fuel return tube secured within said second component aperture, a fuel auxiliary tube secured within said third component aperture, a level sender assembly secured within said fourth component aperture, and a vent assembly secured within said fifth component aperture.

15. A flange, comprising:

a flange body including a base region, a raised region, and a sloped region extending there between, wherein said raised region is positioned vertically upwardly from said base region as measured along a vertical axis of said flange body; and a first component aperture and a second component aperture each positioned on said raised region;

wherein said sloped region includes first, second and third continuous contour lines positioned around said raised region and a plurality of section lines that each extend from said first continuous contour line, through said second continuous contour line, and to said third continuous contour line, wherein said plurality of section lines define an alternating pattern of convex curved regions and concave curved regions extending around said raised region and positioned in a plane perpendicular to said vertical axis of said flange, and wherein said first and second continuous contour lines define a concave contour section therebetween that is positioned in a plane parallel to said vertical axis of said flange body, and wherein said second and third continuous contour lines define a convex contour section therebetween that is positioned in a plane parallel to said vertical axis of said flange body, and wherein said flange defines a line of stress extending between said first component aperture and said second component aperture, and wherein said alternating pattern includes first, second and third convex curved regions that each define a normal line positioned in said plane perpendicular to said vertical axis and that intersects said line of stress.

* * * * *